(12) United States Patent
Tomizawa et al.

(10) Patent No.: US 9,425,658 B2
(45) Date of Patent: Aug. 23, 2016

(54) ROTOR AND ROTATING ELECTRIC MACHINE HAVING THE SAME

(71) Applicant: DENSO CORPORATION, Kariya, Aichi-pref. (JP)

(72) Inventors: Hiroki Tomizawa, Kariya (JP); Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 522 days.

(21) Appl. No.: 14/034,959

(22) Filed: Sep. 24, 2013

(65) Prior Publication Data

US 2014/0111051 A1   Apr. 24, 2014

(30) Foreign Application Priority Data

Oct. 19, 2012   (JP) .................... 2012-231788

(51) Int. Cl.
*H02K 21/12* (2006.01)
*H02K 1/27* (2006.01)

(52) U.S. Cl.
CPC ........................... *H02K 1/278* (2013.01)

(58) Field of Classification Search
CPC ...................................... H02K 1/278
USPC ............ 310/156.12, 156.19, 156.22, 156.28, 310/156.29
See application file for complete search history.

(56) References Cited

U.S. PATENT DOCUMENTS

| | | | | |
|---|---|---|---|---|
| 4,674,178 A * | 6/1987 | Patel | .............. | H02K 1/278 29/598 |
| 4,742,259 A * | 5/1988 | Schaefer | .............. | H02K 1/278 228/173.1 |
| 5,237,737 A * | 8/1993 | Zigler | .............. | H01F 41/0253 156/297 |
| 2009/0102304 A1* | 4/2009 | Yamamura | .............. | H02K 1/278 310/156.28 |
| 2009/0195102 A1* | 8/2009 | Shibui | .............. | H02K 1/2733 310/156.28 |
| 2010/0133939 A1 | 6/2010 | Takemoto et al. | | |
| 2011/0187219 A1* | 8/2011 | Okitsu | .............. | H02K 1/278 310/156.28 |

FOREIGN PATENT DOCUMENTS

| | | |
|---|---|---|
| JP | 3-36940 | 2/1991 |
| JP | 6-78480 | 3/1994 |
| JP | 2002-10543 | 1/2002 |
| JP | 2012-085445 | 4/2012 |

OTHER PUBLICATIONS

U.S. Appl. No. 13/962,223, Taniguchi, filed Aug. 8, 2013.
Office Action (2 pages) dated Aug. 19, 2014, issued in corresponding Japanese Application No. 2012-231788 and English translation (3 pages).

* cited by examiner

*Primary Examiner* — Thanh Lam
(74) *Attorney, Agent, or Firm* — Nixon & Vanderhye P.C.

(57) ABSTRACT

A rotor has a rotor shaft, a rotor boss, a first magnetic pole, a second magnetic pole, an end cover, and a radially-outer cover. The first and the second magnetic poles are placed to a radially outer periphery of the rotor boss to be alternately arranged in a circumferential direction. A space is defined between the end cover and the first magnetic pole or the second magnetic pole, which is made of a magnet. The radially-outer cover has a first end portion and a second end portion, at least one of the first end portion and the second end portion being defined as a particular end portion. The particular end portion of the radially-outer cover is inwardly crimped onto the end cover in a radial direction.

9 Claims, 14 Drawing Sheets

ROTOR AND ROTATING ELECTRIC MACHINE HAVING THE SAME

CROSS REFERENCE TO RELATED APPLICATION

This application is based on Japanese Patent Application No. 2012-231788 filed on Oct. 19, 2012, the disclosure of which is incorporated herein by reference in its entirety.

TECHNICAL FIELD

The present disclosure relates to a rotor and a rotating electric machine having the same.

BACKGROUND

Conventionally, a rotating electric machine is known to have a rotor and an armature. The rotor is a permanent-magnet type rotor and disposed on an inner side of the armature. For example, JP-2012-85445A discloses a rotor for a rotating electric machine. The rotor is an interior-magnet type rotor having a magnet mounted inside a rotor core. The rotor has a covering portion located on both side surfaces of the magnet in an axial direction. The covering portion is integrally formed with a fixed portion fixed to a rotor shaft, and restricts the magnet from moving in the axial direction.

A surface-magnet type rotor having a magnet on a surface of a rotor core may be employed as the rotor. In this case, a tubular portion is disposed to cover a radially-outer surface of the magnet so that the tubular portion restricts the magnet from being scattered by centrifugal force.

The covering portion of the rotor disclosed in JP-2012-85445A is fixed to only the fixed portion, so a space is produced between the rotor core and the covering portion. Therefore, when the magnet is broken while in use, fragments of the magnets may come out through the space. Moreover, when the covering portion has an extending portion to bias the magnet in the axial direction, a reaction force from the biased magnet is applied to the covering portion. In this case, the space between the rotor core and the covering portion may be broaden, and bigger fragments of the magnet may come out through the space.

When the surface-magnet type rotor is employed, an outer peripheral part of the tubular portion is inwardly crimped onto the covering portion. By crimping the outer peripheral part of the tubular portion, a space may not be produced between the tubular portion and the covering portion. However, when the outer peripheral part of the tubular portion is plastically deformed, a deforming load is applied to the magnet in the axial direction through the covering portion, and the magnet may get broken.

SUMMARY

It is an objective of the present disclosure to provide a rotor and a rotating electric machine having the same, in which the magnet is restricted from breaking, and the fragments of the broken magnet are restricted from scattering.

According to an example of the present disclosure, there is provided a rotor having a rotor shaft, a rotor boss, a first magnetic pole, a second magnetic pole, an end cover, and a radially-outer cover. The rotor boss is fixed to the rotor shaft. The first magnetic pole and the second magnetic pole are placed to a radially outer periphery of the rotor boss to be alternately arranged in a circumferential direction. The end cover is arranged to at least one end of the rotor boss in an axial direction. The radially-outer cover has a tubular shape. The radially-outer cover is fitted to the first magnetic pole, the second magnetic pole and the end cover such that a space is defined between the end cover and the first magnetic pole or the second magnetic pole, which is made of a magnet. The radially-outer cover has a first end portion and a second end portion in the axial direction, and at least one of the first end portion and the second end portion is defined as a particular end portion with which the end cover is fitted. The particular end portion of the radially-outer cover is inwardly crimped onto the end cover in a radial direction.

According to an example of the present disclosure, a rotating electric machine has the rotor and a stator located on an outer side of the rotor in the radial direction such that a magnetic field is produced to rotate the rotor around a rotation axis.

When a pressure (i.e., a deforming force) is applied to the particular end portion of the radially-outer cover toward the magnet, due to the space, the end cover is restricted from contacting the magnet, so the pressure is not applied to the magnet. That is, the magnet is restricted from breakage.

Moreover, a space between the radially-outer cover and the end cover is sealed by the particular end portion of the radially-outer cover, so fragments of the broken magnet are restricted from coming out through the space even if the magnet is broken.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 1:
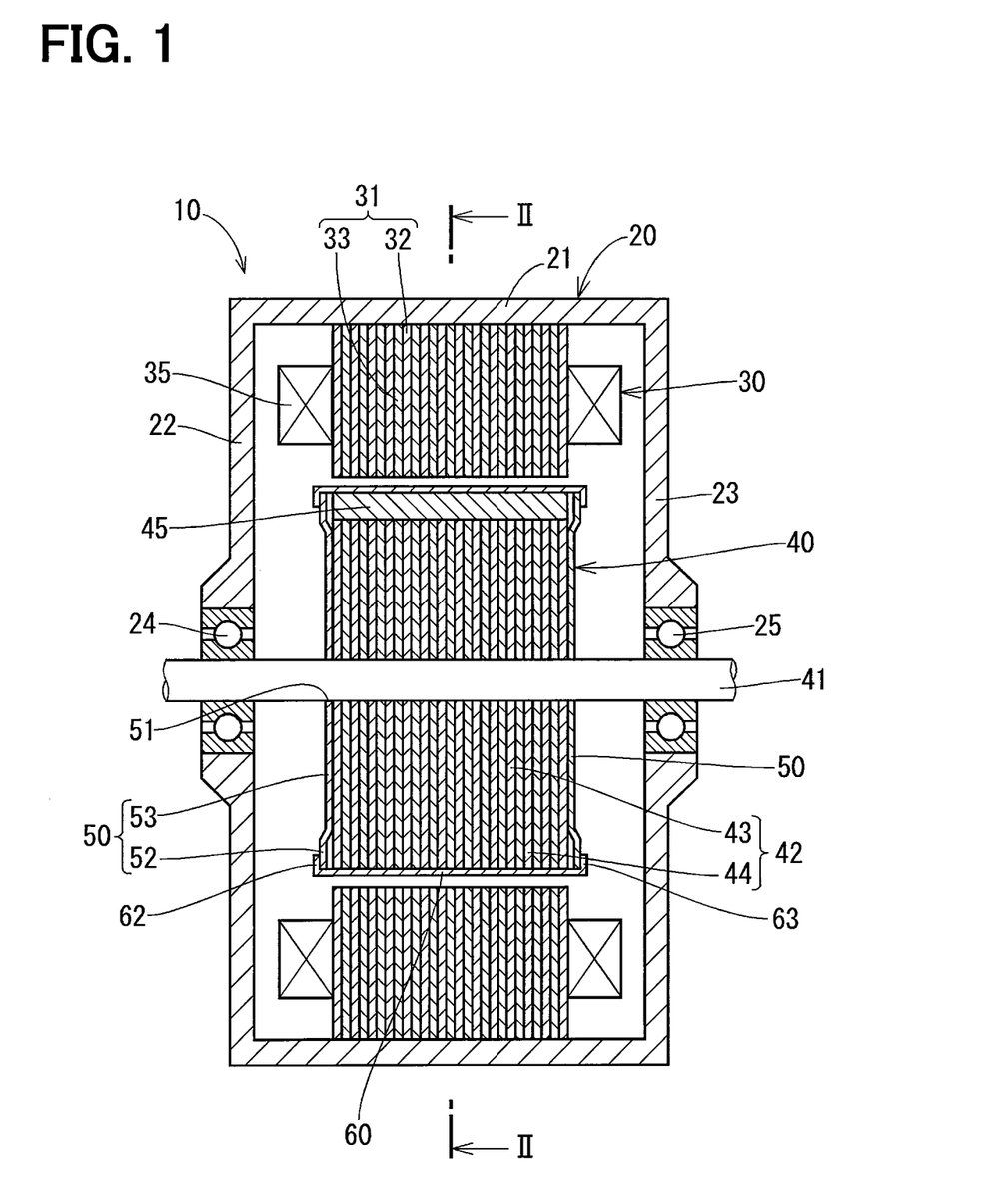
FIG. 1 is a schematic view illustrating a motor having a rotor according to a first embodiment.
Figure 2:
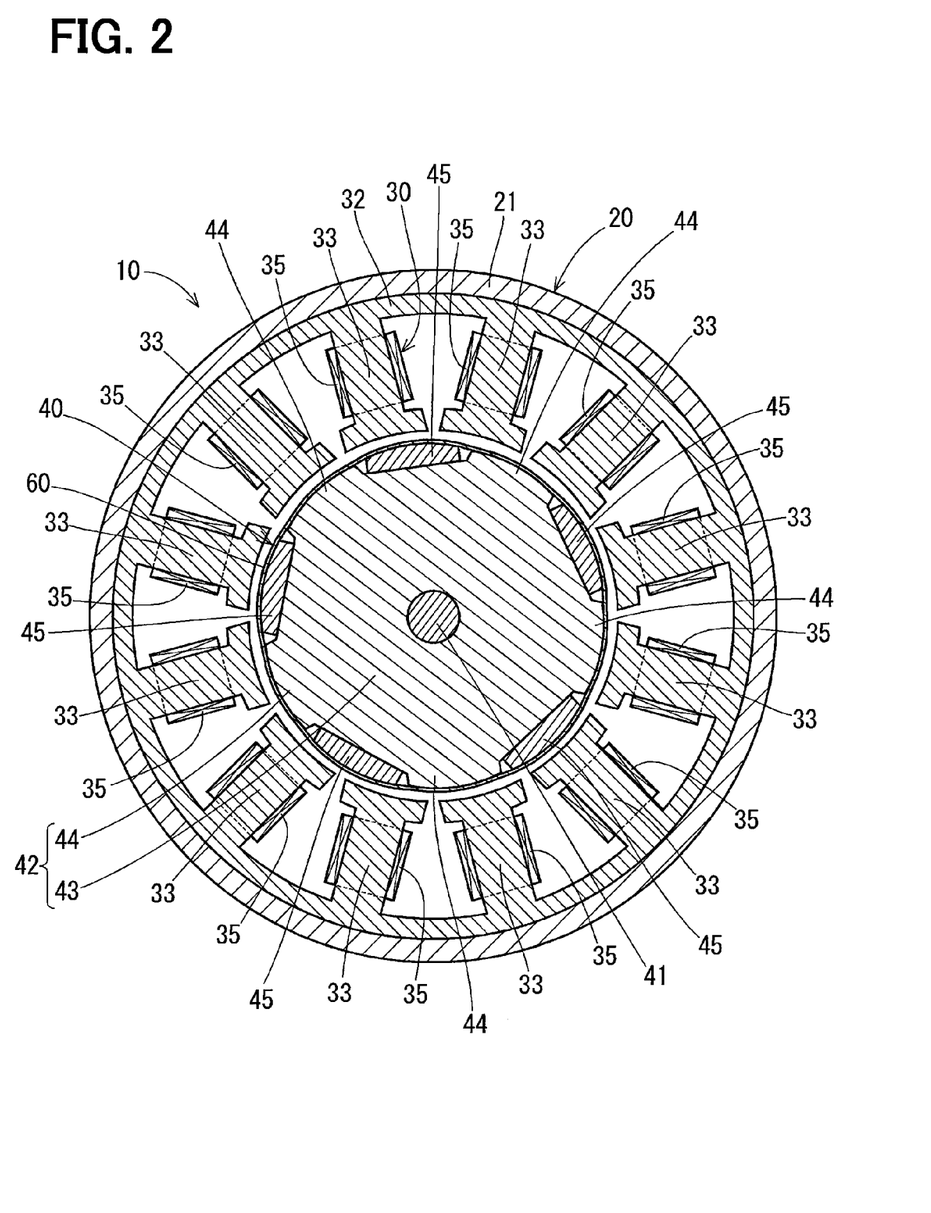
FIG. 2 is a schematic cross-sectional view taken along a line II-II in FIG. 1.

A rotor according to a first embodiment is employed to a motor 10 shown in FIGS. 1 and 2. The motor 10 is referred to as a rotating electric machine.

As shown in FIGS. 1 and 2, the motor 10 is a three-phase brushless motor. The motor has a case portion 20, a stator 30, and a rotor 40.

The case portion 20 has a tube portion 21, a first side portion 22 sealing a first opening of the tube portion 21, and a second side portion 23 sealing a second opening of the tube portion 21. The first and the second indicate a left side and a right side, respectively, in FIG. 1. The first side portion 22 has a bearing 24 at a center of the first side portion 22. The second side portion 23 has a bearing 25 at a center of the second side portion 23.

The stator 30 is an armature fixed to an inner wall of the tube portion 21 of the case portion 20. The stator 30 has a stator core 31 and coils 35.

As shown in FIG. 2, the stator core 31 has a ring portion 32 and teeth portions 33. The ring portion 32 is fixed to the inner wall of the tube portion 21 by a method such as press-fitting. The teeth portions 33 extend from the ring portion 32 in a radially-inward direction. According to the first embodiment, the stator core 31 has twelve of teeth portions 33 arranged at regular intervals in a circumferential direction of the ring portion 32. The stator core 31 is made of steel plates laminated in an axial direction, as shown in FIG. 1.

The coil 35 is wound around the teeth portion 33 of the stator core 31, and the coil 35 may be a U-phase coil, a V-phase coil, or a W-phase coil. The U-phase coil, the V-phase coil, and the W-phase coil may be arranged in this order in a clockwise direction.

The rotor 40 is a consequent-pole-type rotor employing a permanent magnet. The rotor 40 has a rotor shaft 41, a rotor core 42, and at least one magnet 45. For example, the rotor 40 has five of the magnet 45 according to the first embodiment.

The rotor shaft 41 is made of a non-magnetic material and rotatably supported by the bearings 24 and 25.

The rotor core 42 is made of a soft-magnetic material and has a rotor boss 43 fixed to the rotor shaft 41 by a method such as press-fitting. The rotor core 42 has at least one extending portion 44 extending from the rotor boss 43 in the radial direction. For example, the rotor core 42 has five of the extending portion 44 according to the first embodiment. The extending portion 44 is made of a soft-magnetic material and located on an outer periphery of the rotor boss 43 in the radial direction to be arranged in a circumferential direction. The extending portion 44 is referred to as a first magnetic pole. The rotor core 42 according to the first embodiment is made of steel plates laminated in the axial direction.

The magnet 45 is located on the outer periphery of the rotor boss 43. The magnet 45 and the extending portion 44 are arranged alternately in the circumferential direction. The magnet 45 is referred to as a second magnetic pole or referred to as one of a first magnetic pole and a second magnetic pole, which is made of magnet. The rotor boss 43 transmits a magnetic flux produced by the magnet 45. That is, the rotor boss 43 is a magnetic flux transmitter.

In the motor 10, the coil 35 is coupled with a power converter (not shown) having devices such as an inverter, an electronic control unit and battery. By applying electrical power to the coil 35 in turn, a magnetic field rotating in a circumferential direction is produced. The rotor 40 is rotated based on the magnetic field.

The rotor 40 will be specifically described with reference to FIGS. 3-8.

Figure 3:
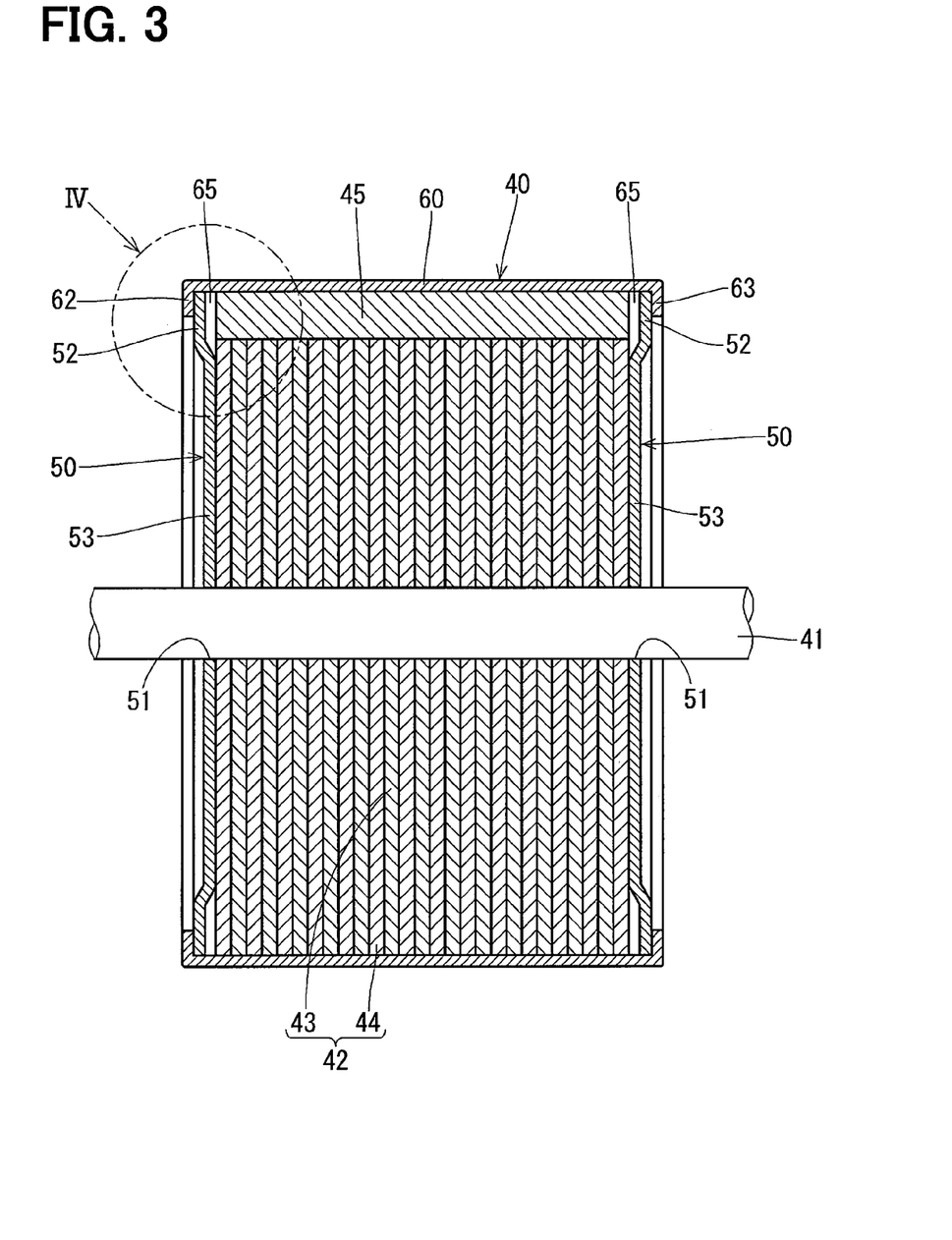
FIG. 3 is a vertical-cross-sectional view illustrating the rotor shown in FIG. 1.
Figure 4:
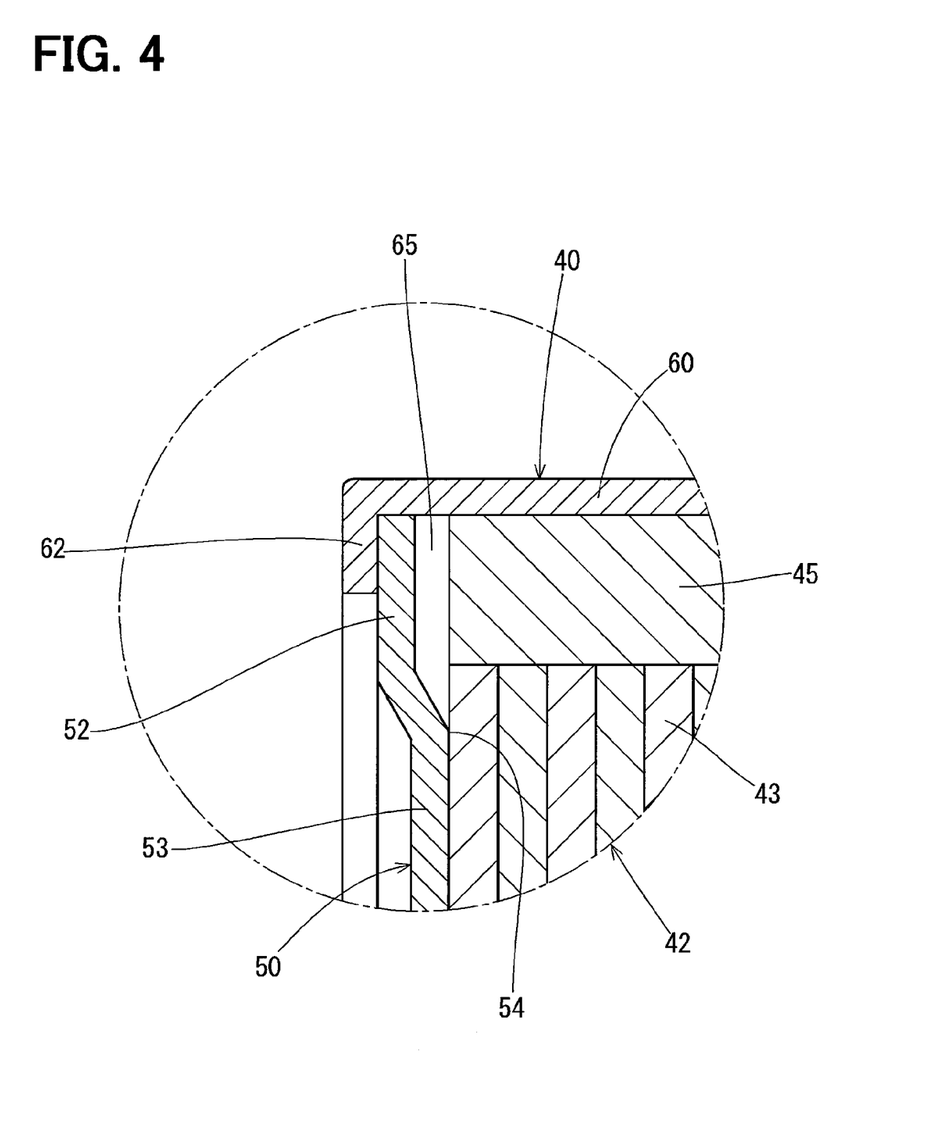
FIG. 4 is an enlarged view illustrating a part IV shown in FIG. 3.

As shown in FIGS. 3 and 4, the rotor 40 has an end cover 50 and a radially-outer cover 60. The end cover 50 is round-shaped and made of a non-magnetic material. Both side surfaces of the rotor boss 43 have one end cover 50 for each in the axial direction. The end cover 50 has a through-hole 51 at a center and is fixed to the rotor shaft 41 by press-fitting. The end cover 50 has an outer periphery part 52 and an inner periphery part 53. The outer periphery part 52 is located on an outer side of the inner periphery part 53 in the radial direction. A distance from the rotor boss 43 to the outer periphery part 52 in the axial direction is larger than a distance from the rotor boss 43 to the inner periphery part 53 in the axial direction, such that the end cover 50 has a stepped-shape. As shown in FIG. 4, the inner periphery part 53 has an outer edge 54 located on an inner side from the extending portion 44 and the magnet 45 in the radial direction. A space 65 is defined between the outer periphery part 52 and the magnet 45. The space 65 has a ring shape and separates the end cover 50 from the magnet 45 along an entire circumference of the space 65.

The radially-outer cover 60 has a thin-walled tubular shape and is made of a non-magnetic material. The radially-outer cover 60 is press-fittedly fixed to the rotor core 42 such that the radially-outer cover 60 is fitted to the extending portion 44, the magnet 45, and the end cover 50. The radially-outer cover 60 has a first end portion 62 and a second end portion 63 in the axial direction. At least one of the first end portion 62 and the second end portion 63 is defined as a particular end portion with which the end cover 50 is fitted. All around of the first end portion 62 and the second end portion 63 are inwardly crimped (i.e., plastically deformed inwardly) onto the end cover 50. According to the first embodiment, the particular end portion of the radially-outer cover 60 has a surface, and the surface contacts with a surface of the end cover 50. In other words, the first end portion 62 has a surface tightly contacting with a surface of the end cover 50, and the second end portion 63 has a surface tightly contacting with a surface of the end cover 50. No space is defined between the first end portion 62 and the end cover 50 along an entire circumferential extent of the end cover and no space is defined between the second end portion 63 and the end cover 50 along an entire circumferential extent of the end cover.

Figure 5:
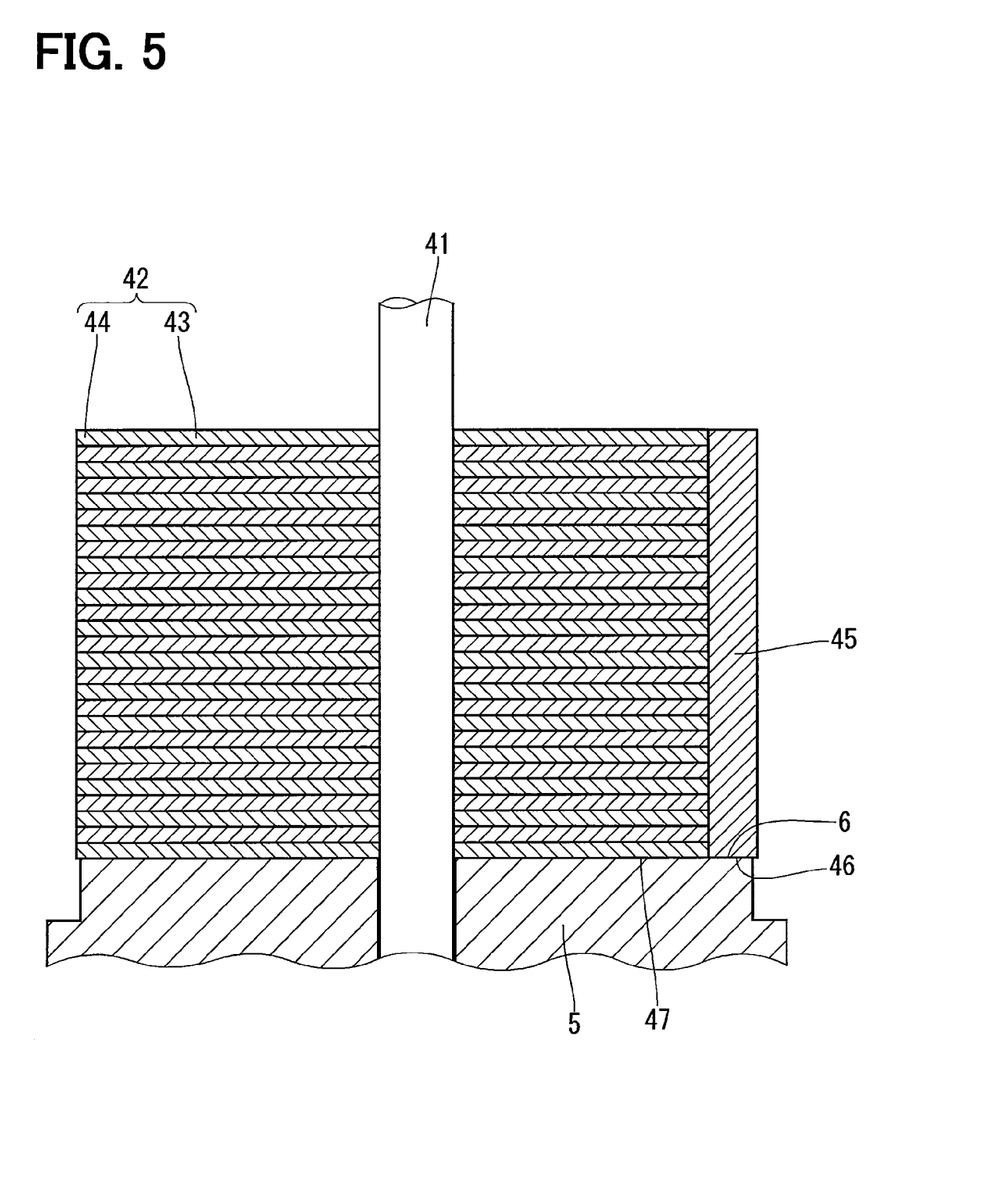
FIG. 5 is a cross-sectional view illustrating a process producing the rotor in which a magnet is fixed to a rotor core press-fitted to a rotor shaft.

In assembly of the rotor 40, the rotor core 42 is press-fitted to the rotor shaft 41 as shown in FIG. 5, and the magnet 45 is set to each space between the extending portions 44 located adjacent with each other in the circumferential direction. According to the first embodiment, the magnet 45 has the same length in the axial direction as the rotor core 42 has. The magnet 45 has an end surface 46 in the axial direction, and the rotor core 42 has an end surface 47 in the axial direction. The end surface 46 and the end surface 47 are arranged to form a flat surface extending in the radial direction.

Figure 6:
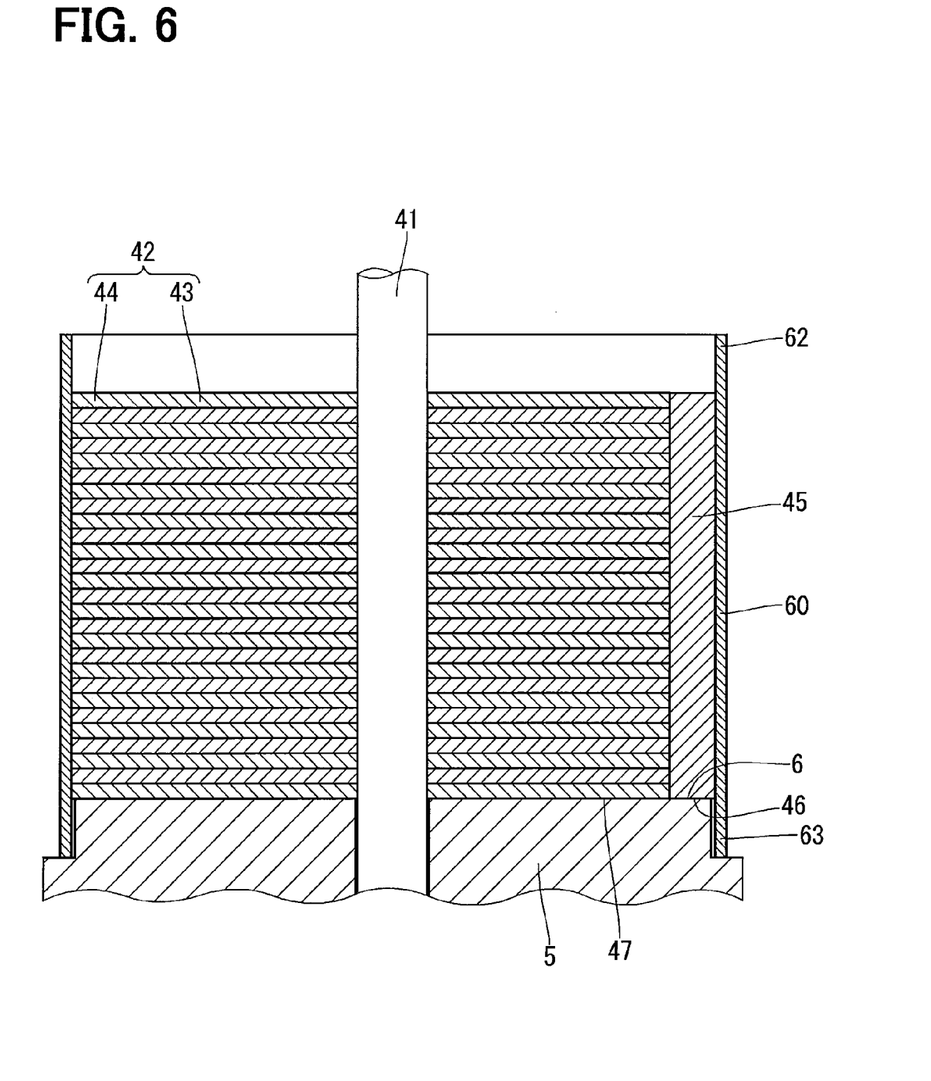
FIG. 6 is a cross-sectional view illustrating a process producing the rotor in which a radially-outer cover is press-fitted to the rotor core.

As shown in FIG. 6, the radially-outer cover 60 is placed by press-fitting onto the magnet 45 and the extending portion 44. By using a jig 5, a surface 6 of the jig 5 restricts the magnet 45 from misaligning.

Figure 7:
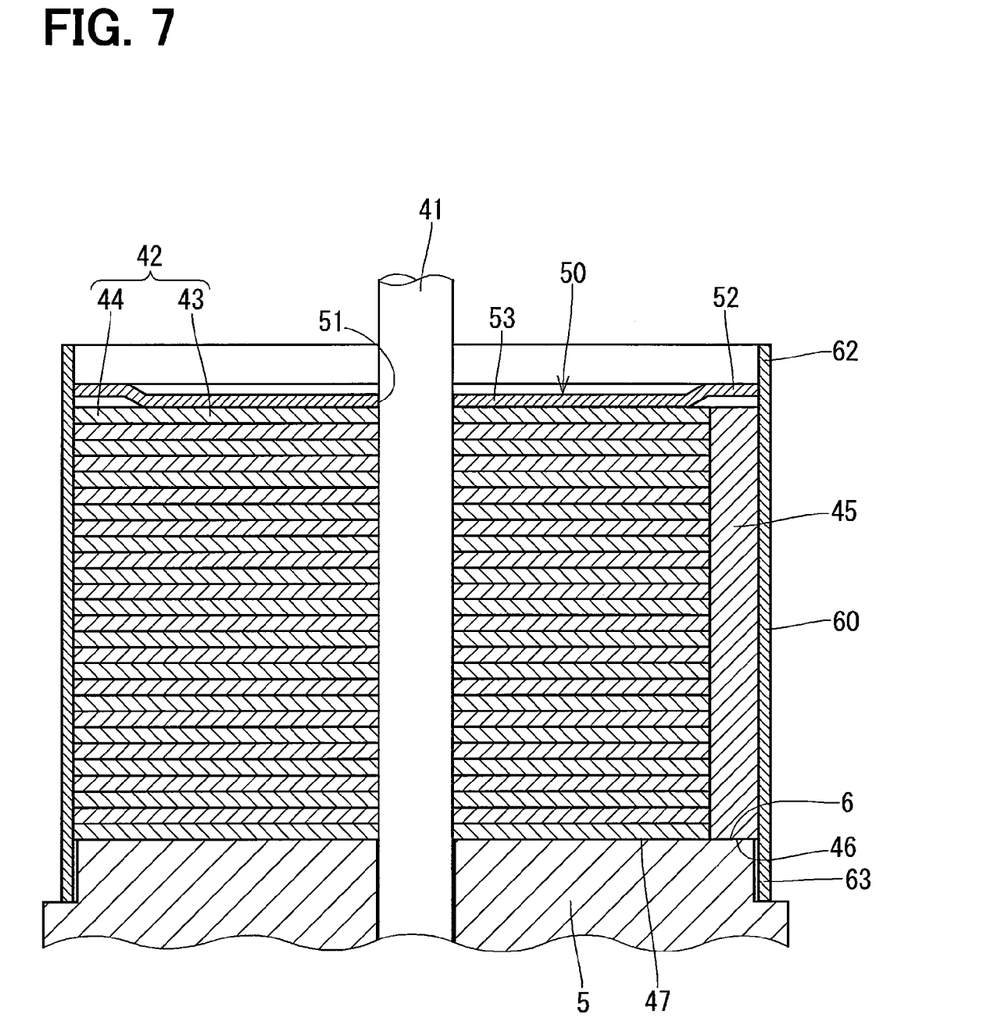
FIG. 7 is a cross-sectional view illustrating a process producing the rotor in which an end cover is press-fitted to the rotor shaft.

The end cover 50 is press-fitted to the rotor shaft 41 as shown in FIG. 7.

Figure 8:
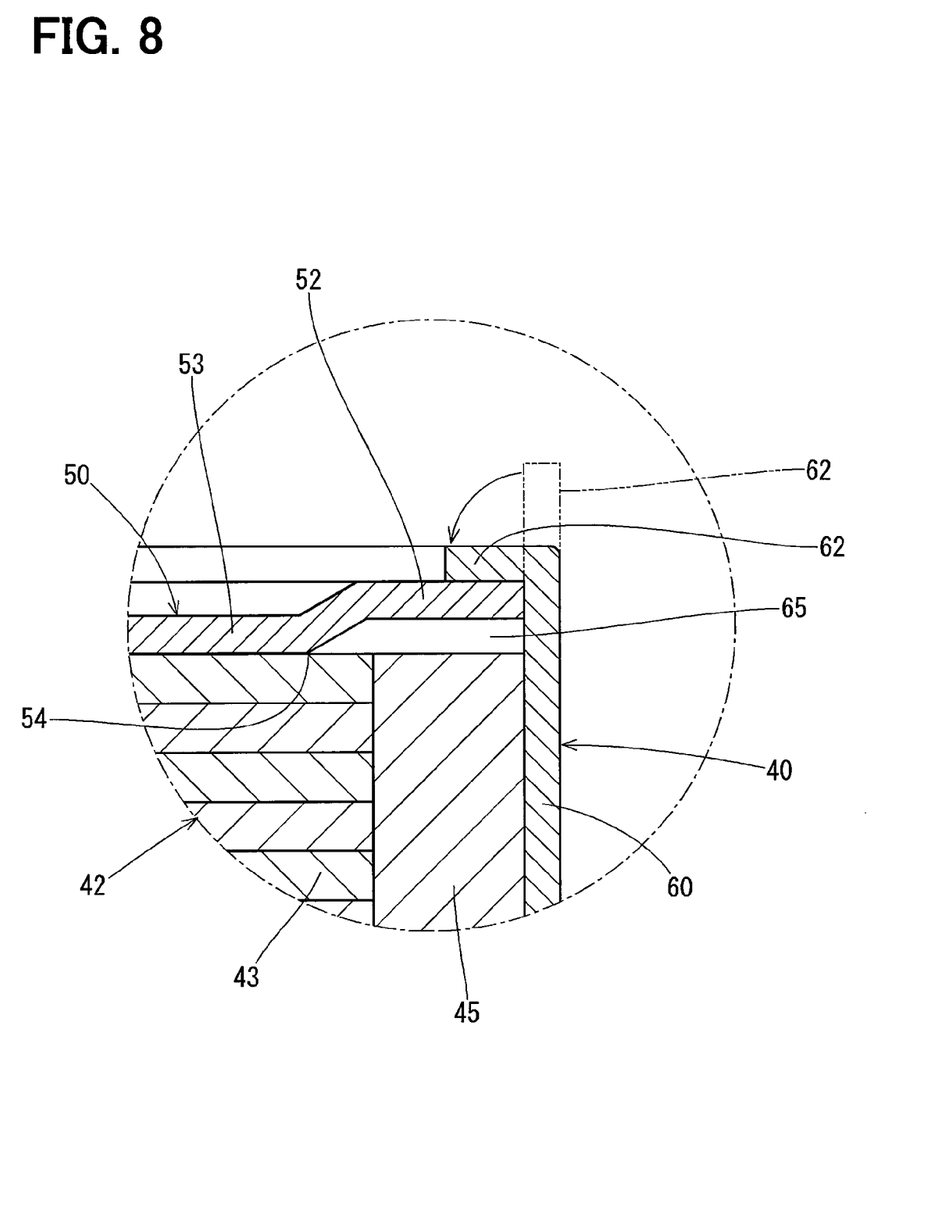
FIG. 8 is an enlarged cross-sectional view illustrating a process producing the rotor in which the radially-outer cover is plastically deformed onto the end cover.

The first end portion 62 of the radially-outer cover 60 is inwardly bent in the radial direction as shown in FIG. 8. When the first end portion 62 is crimped onto the end cover 50, a crimping force is applied to the end cover 50 in the axial direction. The end cover 50 has a thickness whose value is determined based on a degree of the crimping force. The space 65 is defined between the end cover 50 and the magnet 45, and is predetermined large enough to restrict the end cover 50 from contacting the magnet 45 when the first end portion 62 is crimped onto the end cover 50.

To sum up of the first embodiment, the rotor 40 has the end cover 50 and the radially-outer cover 60. The end cover 50 having the flat-plate shape is arranged to at least one axial end of the rotor boss 43. The radially-outer cover 60 is tubular-shaped and fitted to the extending portion 44, the magnet 45, and the end cover 50. The space 65 is defined between the end cover 50 and both of the extending portion 44 and the magnet 45. The first end portion 62 and the second end portion 63 are inwardly bent in the radial direction and are crimped onto the end cover 50 in the axial direction.

When the first end portion 62 and the second end portion 63 are crimped onto the end cover 50, a pressure (i.e., the crimping force) is applied to the end cover 50 through the first end portion 62 and the second end portion 63. The crimping force is diffused to the space 65 (and the end cover 50 pressed by the crimping force stays within the space 65), so the end cover 50 is restricted from contacting the magnet 45. Therefore, the magnet 45 is restricted from receiving the crimping force. Thus, the magnet 45 is restricted from breakage.

A space defined between the end cover 50 and the radially-outer cover 60 is sealed by the first end portion 62 and the second end portion 63. Therefore, fragments of the magnet 45, which are pieces of the magnet 45 broken while in use, are restricted from coming out through the space.

According to the first embodiment, the first end portion 62 and the second end portion 63 are crimped onto the end cover 50 along an entire circumferential extent of the end cover 50. Therefore, the space between the end cover 50 and the radially-outer cover 60 is sealed completely, and the fragments of the magnet 45 are prevented from coming out through the space.

Moreover, each of the first end portion 62 and the second end portion 63 has a surface contact with the end cover 50. Therefore, the space between the end cover 50 and the radially-outer cover 60 is tightly sealed more effectively.

According to the first embodiment, the end cover 50 has the outer periphery part 52 and the inner periphery part 53 located on an outer side of the inner periphery part 53 in the radial direction. The end cover 50 has a round shape such that a distance from the rotor boss 44 to the outer periphery part 52 in the axial direction is larger than a distance from the rotor boss 44 to the inner periphery part 53 in the axial direction. The end cover 50 having such a structure can be made by pressing work at a low cost. Furthermore, by making the end cover 50 by pressing work, a yield rate can be higher than making the end cover 50 by cutting work, so a material cost can be reduced.

The inner periphery part 53 has the outer edge 54 which is located on an inner side from the extending portion 44 and the magnet 45 in the radial direction. Thus, the end cover 50 is completely prevented from contacting the magnet 45, so the magnet 45 can be restricted from breakage when the first end portion 62 and the second end portion 63 are crimped onto the end cover 50.

According to the first embodiment, in assembly of the rotor core 42 and the magnet 45, the surface 46 of the magnet 45 and the surface 47 of the rotor core 42 form the flat surface. By using the flat surface as a base, the assembly of the rotor core 42 can be easy.

(Second Embodiment)

Figure 9:
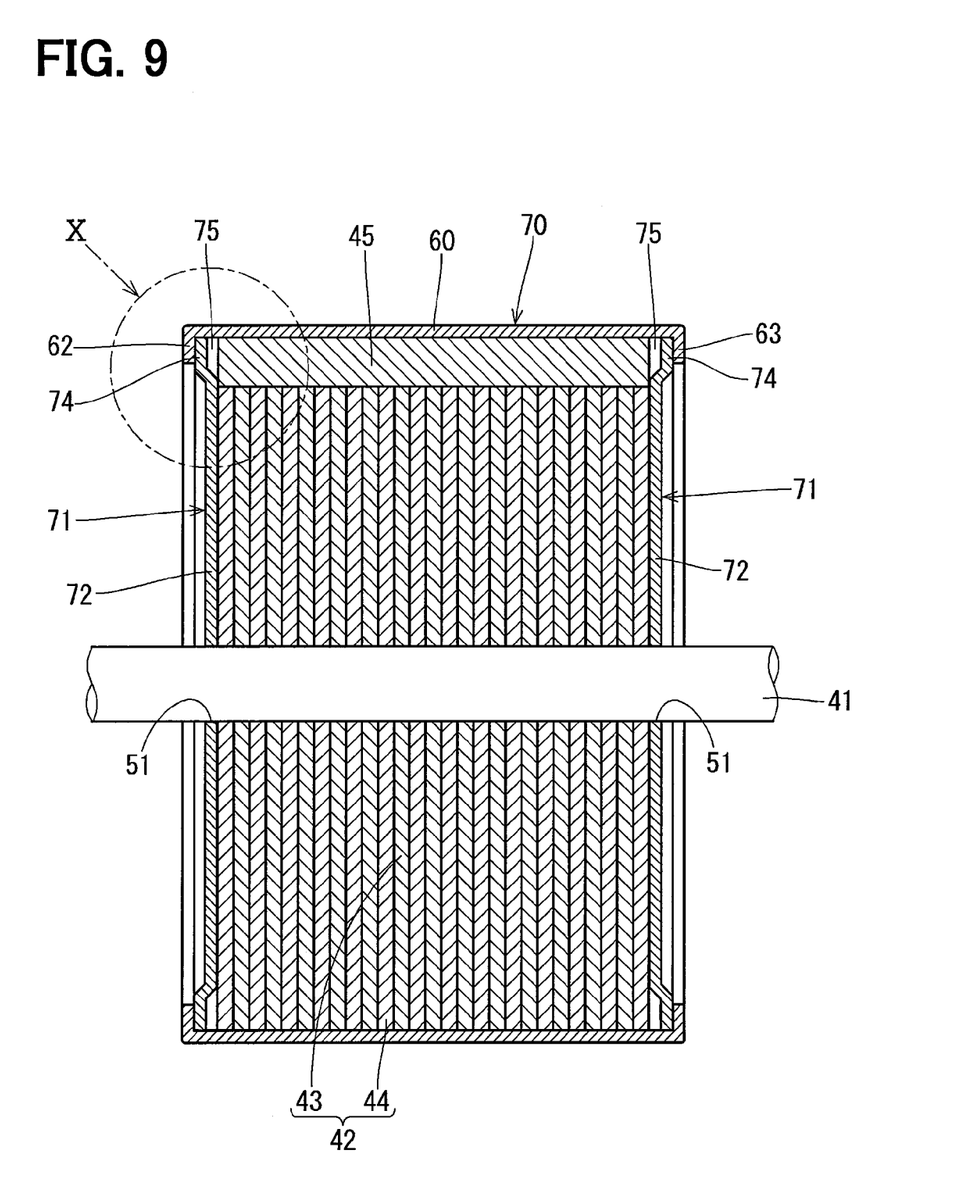
FIG. 9 is a vertical-cross-sectional view illustrating a rotor according to a second embodiment.
Figure 10:
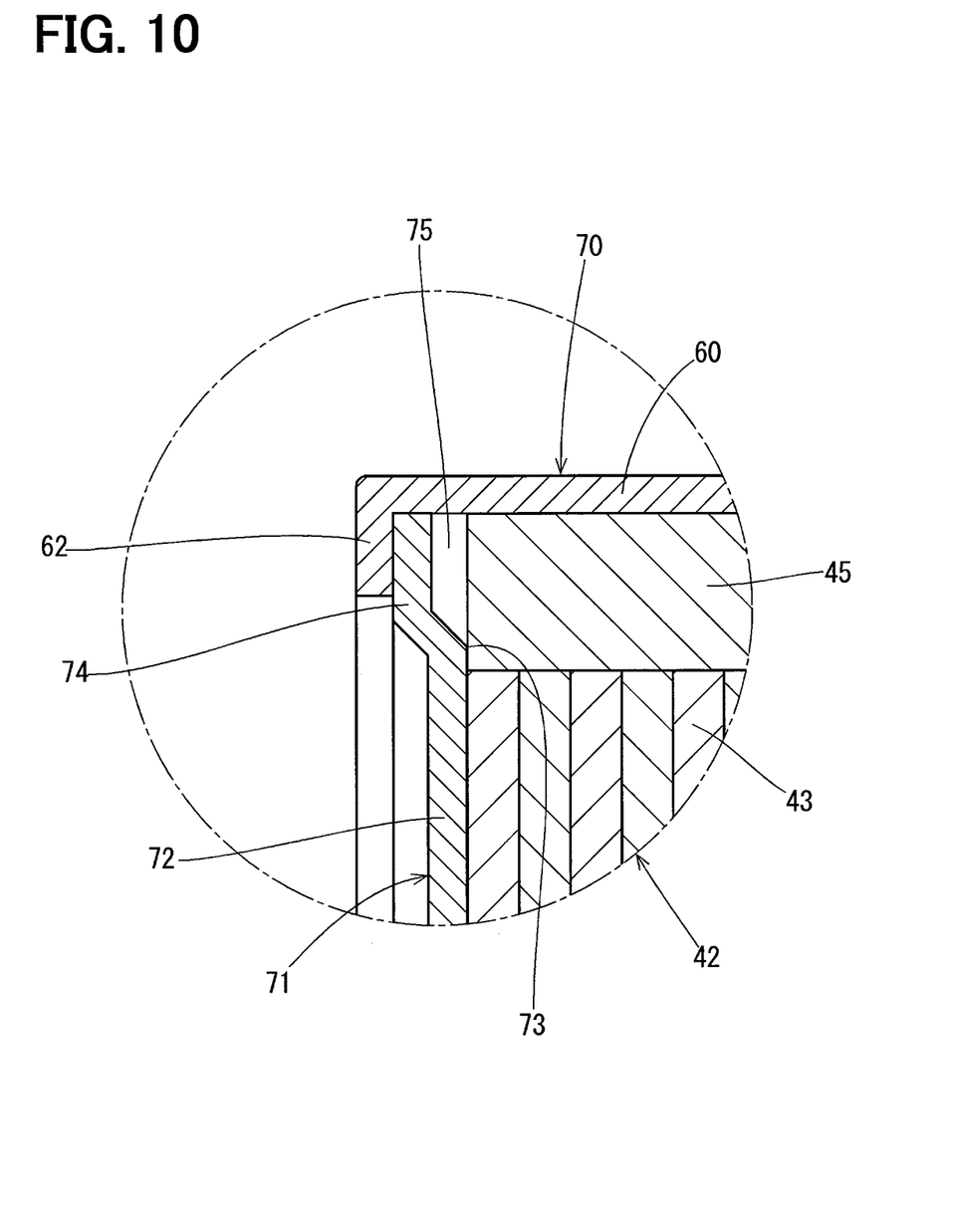
FIG. 10 is an enlarged view illustrating a part X shown in FIG. 9.

According to a second embodiment, a rotor 70 has an end cover 71 instead of the end cover 50. As shown in FIGS. 9 and 10, the end cover 71 has an inner periphery part 72 and an outer periphery part 74. The outer periphery part 74 is located on an outer side of the inner periphery part in the radial direction. A distance from the rotor boss 44 to the outer periphery part 74 in the axial direction is larger than a distance from the rotor boss 44 to the inner periphery part 72 in the axial direction. The inner periphery part 72 has an outer edge 73 which is located in a range of the magnet 45 in the radial direction. Thus, the magnet 45 has a surface contacting the outer edge 73 in the axial direction. A space 75 is defined between the outer periphery part 74 and the magnet 45, so the outer periphery part 74 is distanced from the magnet 45 by the space 75 in the axial direction.

When the first end portion 62 of the radially-outer cover 60 and the second end portion 63 of the radially-outer cover 60 are crimped onto the end cover 71, the crimping force is applied to the end cover 71. By having the space 75, the crimping force is diffused to the space 75, so the end cover 71 is restricted from contacting the magnet 45. Therefore, the magnet 45 is restricted from receiving the crimping force. Thus, the magnet 45 is restricted from breakage.

Moreover, the outer edge 73 restricts the magnet 45 from moving in the axial direction while in use.

(Third Embodiment)

Figure 11:
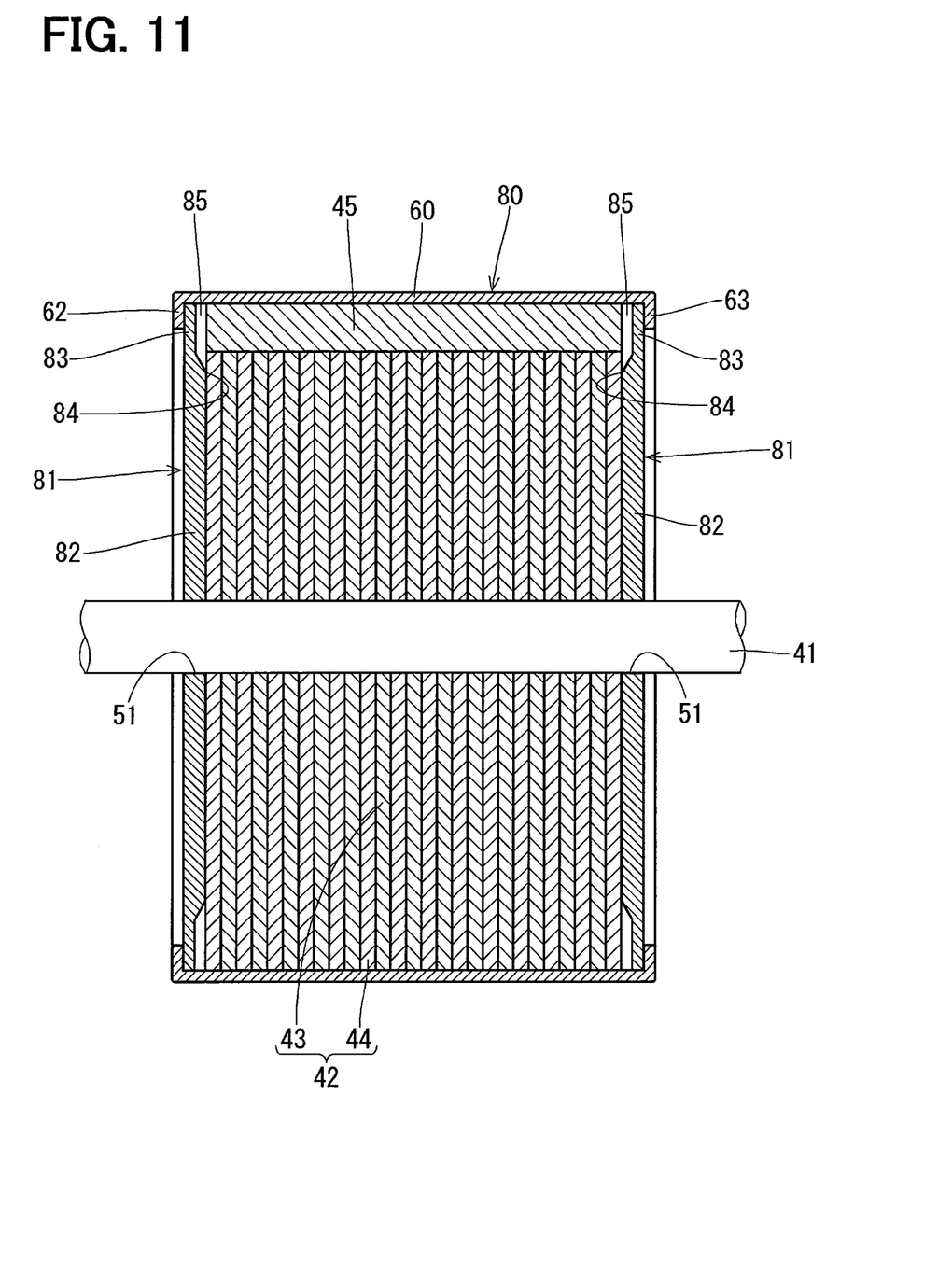
FIG. 11 is a vertical-cross-sectional view illustrating a rotor according to a third embodiment.

As show in FIG. 11, a rotor 80 has an end cover 81 having a round shape. The end cover 81 has an inner periphery part 82 and an outer periphery part 83. The inner periphery part 82 abuts to the rotor boss 43 of the rotor core 42. The outer periphery part 83 is flange-shaped and extending from the inner periphery part 82 in a radially-outward direction. The inner periphery part 82 has an outer edge 84 which is located on the inner side from the magnet 45 in the radial direction. A space 85 is defined between the outer periphery part 83 and the magnet 45, so the outer periphery part 83 is spaced from the magnet 45 in the axial direction while the inner periphery part 82 is in contact with the rotor boss 43. The thickness of the inner periphery part 82 in the axial direction is larger than the thickness of the outer periphery part 83 in the axial direction.

When the first end portion 62 of the radially-outer cover 60 and the second end portion 63 of the radially-outer cover are inwardly bent in the radial direction and crimped onto the end cover 81, the crimping force is applied to the end cover 81. By having the space 85, the crimping force is diffused to the space 85, so the outer periphery part 83 of the end cover 81 is restricted from contacting the magnet 45. Therefore, the magnet 45 is restricted from receiving the crimping force. Thus, the magnet 45 is restricted from breakage.

(Fourth Embodiment)

Figure 12:
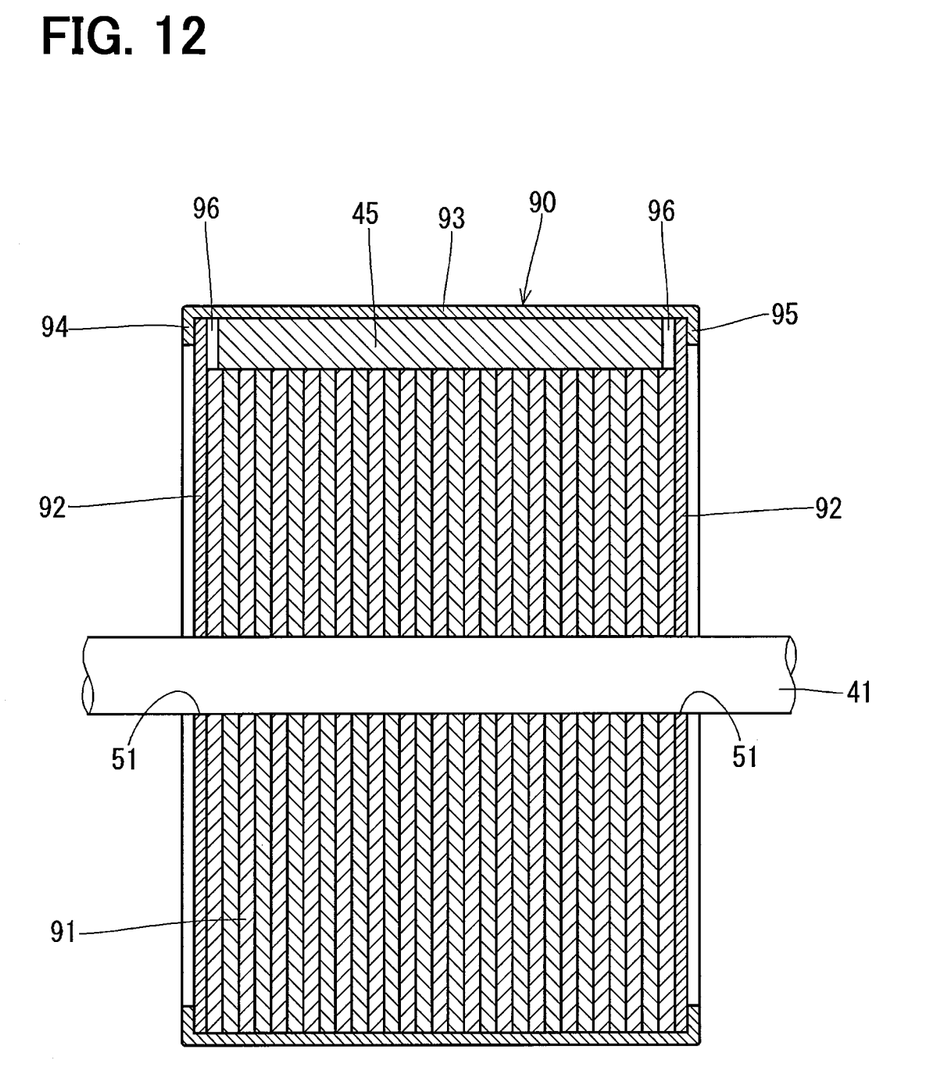
FIG. 12 is a vertical-cross-sectional view illustrating a rotor according to a fourth embodiment.

According to a fourth embodiment, a rotor 90 has a rotor core 91, an end cover 92, and a radially-outer cover 93. The rotor core 91 is larger than the magnet 45 in a length in the axial direction. The end cover 92 has a round shape and has a surface abutting on the rotor core 91 in the axial direction. The radially-outer cover 93 is placed by press fitting such that the radially-outer cover 93 is fitted to the magnet 45 and the rotor core 91. The radially-outer cover 93 has a first end portion 94 and a second end portion 95 in the axial direction. The first end portion 94 and the second end portion 95 are inwardly crimped onto the end cover 92. A space 96 is defined between the end cover 92 and the magnet 45, so the end cover 92 is spaced from the magnet 45 in the axial direction.

When the first end portion 94 and the second end portion 95 are inwardly bent in the radial direction and crimped onto the end cover 92, the crimping force is applied to the end cover 92. By having the space 96, the crimping force is diffused to the space 96, so the end cover 92 is restricted from contacting the magnet 45. Therefore, the magnet 45 is restricted from receiving the crimping force. Thus, the magnet 45 is restricted from breakage in the same manner as the first embodiment.

(Fifth Embodiment)

Figure 13:
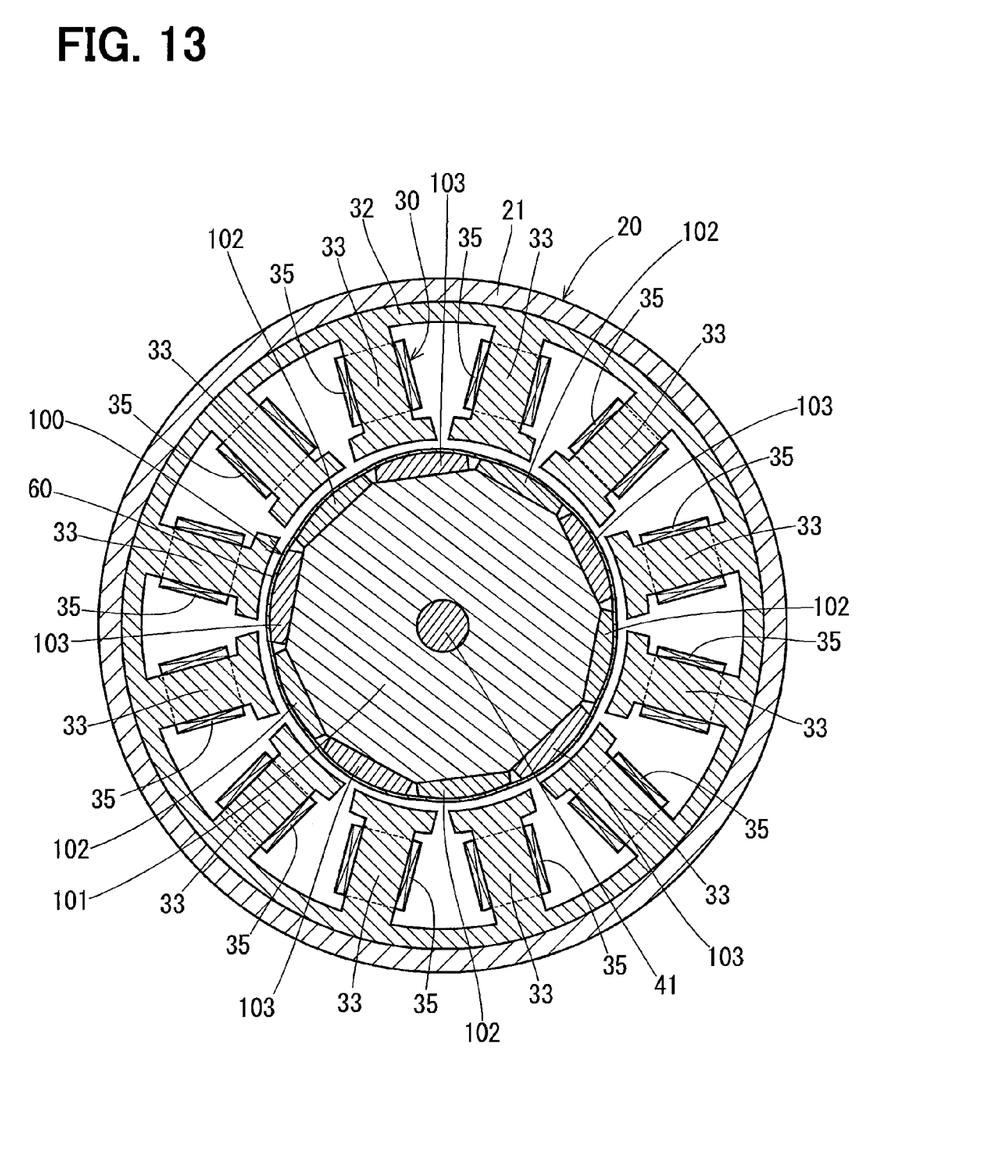
FIG. 13 is a schematic view illustrating a motor having a rotor according to a fifth embodiment.
Figure 14:
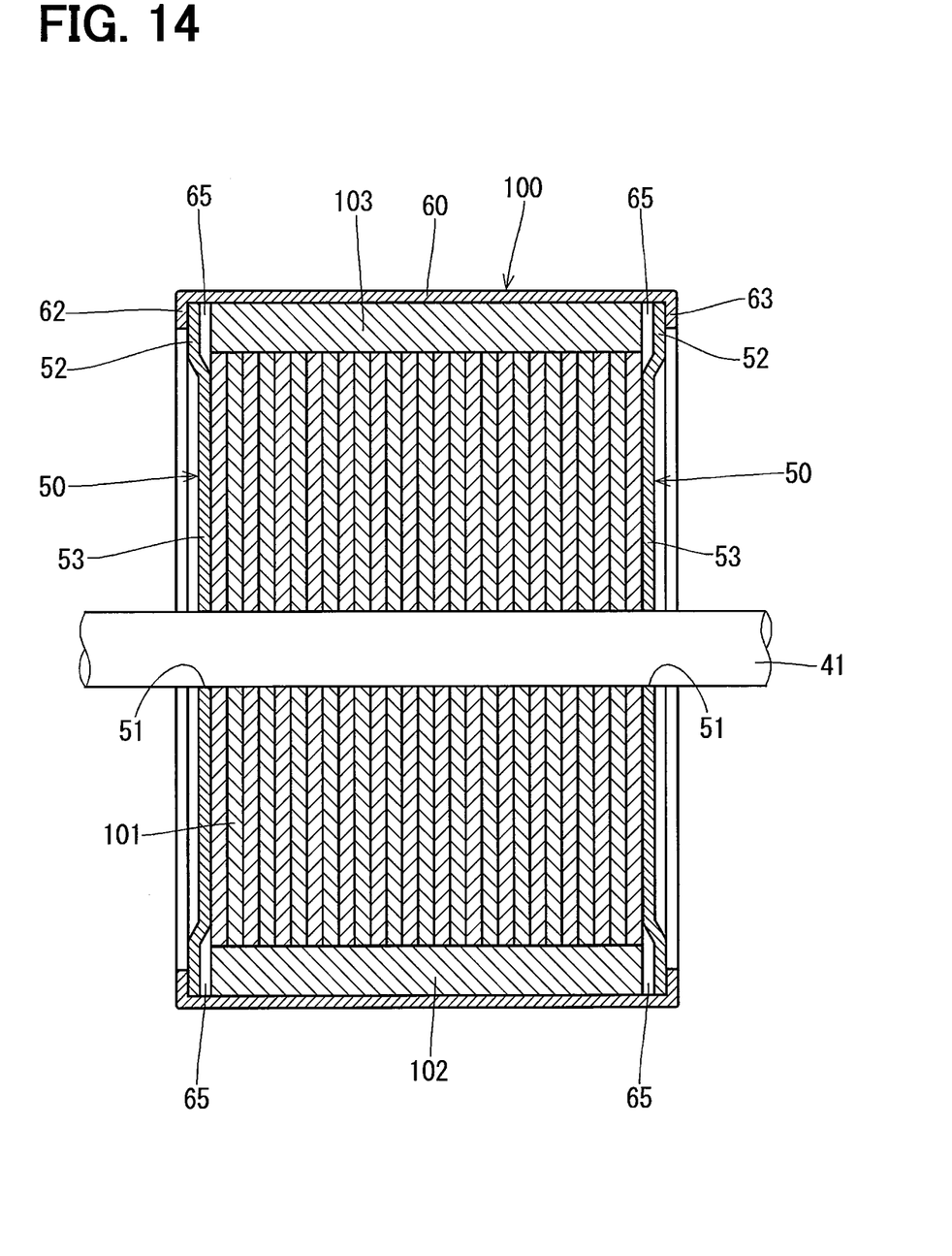
FIG. 14 is a vertical-cross-sectional view illustrating the rotor shown in FIG. 13.

A fifth embodiment will be described with reference to FIGS. 13 and 14. A rotor 100 is a permanent-magnet type rotor. The rotor 100 has the rotor shaft 41, a rotor boss 101, a first magnet 102, and a second magnet 103. The rotor boss 101 is made of a soft-magnetic material and fixed to the rotor shaft 41 by a method such as press-fitting. The first magnet 102 and the second magnet 103 are placed to a radially outer periphery of the rotor boss 101 to be alternately arranged in the circumferential direction. The first magnet 102 is referred to as a first magnetic pole. The second magnet 103 is referred to as a second magnetic pole and has an opposite magnetic polarity in the radial direction with respect to the first magnet 102.

According to the fifth embodiment, the space 65 is defined between the end cover 50 and the first magnet 102, and the space 65 is defined between the end cover 50 and the second magnet 103. When the first end portion 62 and the second end portion 63 are inwardly crimped onto the end cover 50 in the radial direction, the crimping force is applied to the end cover 50. By having the space 65, the crimping force is diffused to the space 65, so the end cover 50 is restricted from contacting the first magnet 102 and the second magnet 103. Therefore, the first magnet 102 and the second magnet 103 are restricted from receiving the crimping force. Thus, the first magnet 102 and the second magnet 103 are restricted from breakage.

Further, a space defined between the end cover 50 and the radially-outer cover 60 is sealed by the first end portion 62 and the second end portion 63 which are crimped onto the end cover 50. Therefore, when the first magnet 102 or the second magnet 103 is broken while in use, fragments of the first magnet 102 or the second magnet 103 are restricted from coming out through the space.

(Other Embodiment)

An end cover may be placed on only one side of a rotor core in the axial direction. In such a case, a radially-outer cover may have a bottomed-tubular shape. For example, the radially-outer cover is placed such that a bottom of the radially-outer cover is located on an opposite side of the rotor core with respect to the end cover in the axial direction. The end cover and the bottom of the radially-outer cover may restrict the magnets from misaligning in the axial direction.

The radially-outer cover has a first end portion and a second end portion. Although each of the first end portion and the second end portion has a surface fitted to a surface of the end cover according to the first to fifth embodiments, each of the first end portion and the second end portion may have a line contact with the end cover.

Although the first end portion and the second end portion are crimped onto the end cover along the entire circumferential extent of the end cover according to the first to fifth embodiments, the radially-outer cover is not limited to be crimped along the entire circumferential extent. The radially-outer cover may have an extending portion extending in the radially-outward direction such that a location of the extending portion corresponds to the magnet. In such a case, the extending portion is inwardly bent in the radial direction and crimped onto the end cover.

The end cover is not limited to be fixed to a rotor shaft by press-fitting. The end cover may be fixed to the rotor core by using adhesive or a catching mechanism.

A rotor boss is not limited to be fixed to the rotor shaft by press-fitting. The rotor boss may be fixed to the rotor shaft by using adhesive.

A first magnetic pole and a second magnetic pole may be configured by a ring-shaped magnet. In such a case, the first magnetic pole and the second magnetic pole are arranged alternately in a circumferential direction of the ring-shaped magnet.

The rotor core is not limited to be made of laminated steel plates. The rotor core may be made of magnetic powders by compression molding.

The rotor shaft may be made of a magnetic material. However, the rotor may be a consequent-pole type. In such a case, by making the rotor shaft from a non-magnetic material, a failure caused by magnetized rotor shaft may not be caused.

A number of magnetic poles of the rotor is not limited to ten.

A number of coils of a stator is not limited to twelve. Each of the teeth portions may be made of a material separated from the stator.

The rotor can be employed to other rotating electric machines such as a power generator.

Such changes and modifications are to be understood as being within the scope of the present disclosure as defined by the appended claims.

What is claimed is:

1. A rotor comprising:
   a rotor shaft;
   a rotor boss fixed to the rotor shaft;
   a first magnetic pole and a second magnetic pole placed to a radially outer periphery of the rotor boss to be alternately arranged in a circumferential direction;
   an end cover arranged to at least one end of the rotor boss in an axial direction; and
   a radially-outer cover having a tubular shape, wherein
   the radially-outer cover is fitted to the first magnetic pole, the second magnetic pole and the end cover such that a space is defined between the end cover and the first magnetic pole or the second magnetic pole, which is made of a magnet,
   the radially-outer cover has a first end portion and a second end portion in the axial direction, at least one of the first end portion and the second end portion being defined as a particular end portion with which the end cover is fitted, and
   the particular end portion of the radially-outer cover is inwardly bent in a radial direction and is crimped onto the end cover.

2. The rotor according to claim 1 wherein
   the first magnetic pole is made of a soft-magnetic material, and
   the second magnetic pole is made of a magnet.

3. The rotor according to claim 1 wherein
   the first magnetic pole is made of a magnet, and
   the second magnetic pole is made of a magnet having an opposite magnetic polarity with respect to the first magnetic pole.

4. The rotor according to claim 1 wherein
   the particular end portion of the radially-outer cover is crimped onto the end cover along an entire circumferential extent of the end cover.

5. The rotor according to claim 1 wherein
the particular end portion of the radially-outer cover has a surface contact with the end cover.

6. The rotor according to claim 1 wherein
the end cover has an inner periphery part and an outer periphery part located on an outer side of the inner periphery part in the radial direction, and
the end cover has a round shape such that a distance from the rotor boss to the outer periphery part in the axial direction is larger than a distance from the rotor boss to the inner periphery part in the axial direction.

7. The rotor according to claim 6 wherein
the inner periphery part has an outer edge which is located on an inner side from the first magnetic pole and the second magnetic pole in the radial direction.

8. The rotor according to claim 6 wherein
the inner periphery part has an outer edge which is located in a range of the first magnetic pole and the second magnetic pole in the radial direction.

9. A rotating electric machine comprising:
the rotor according to claim 1; and
a stator located on an outer side of the rotor in the radial direction such that a magnetic field is produced to rotate the rotor around a rotation axis.

* * * * *